UNITED STATES PATENT OFFICE.

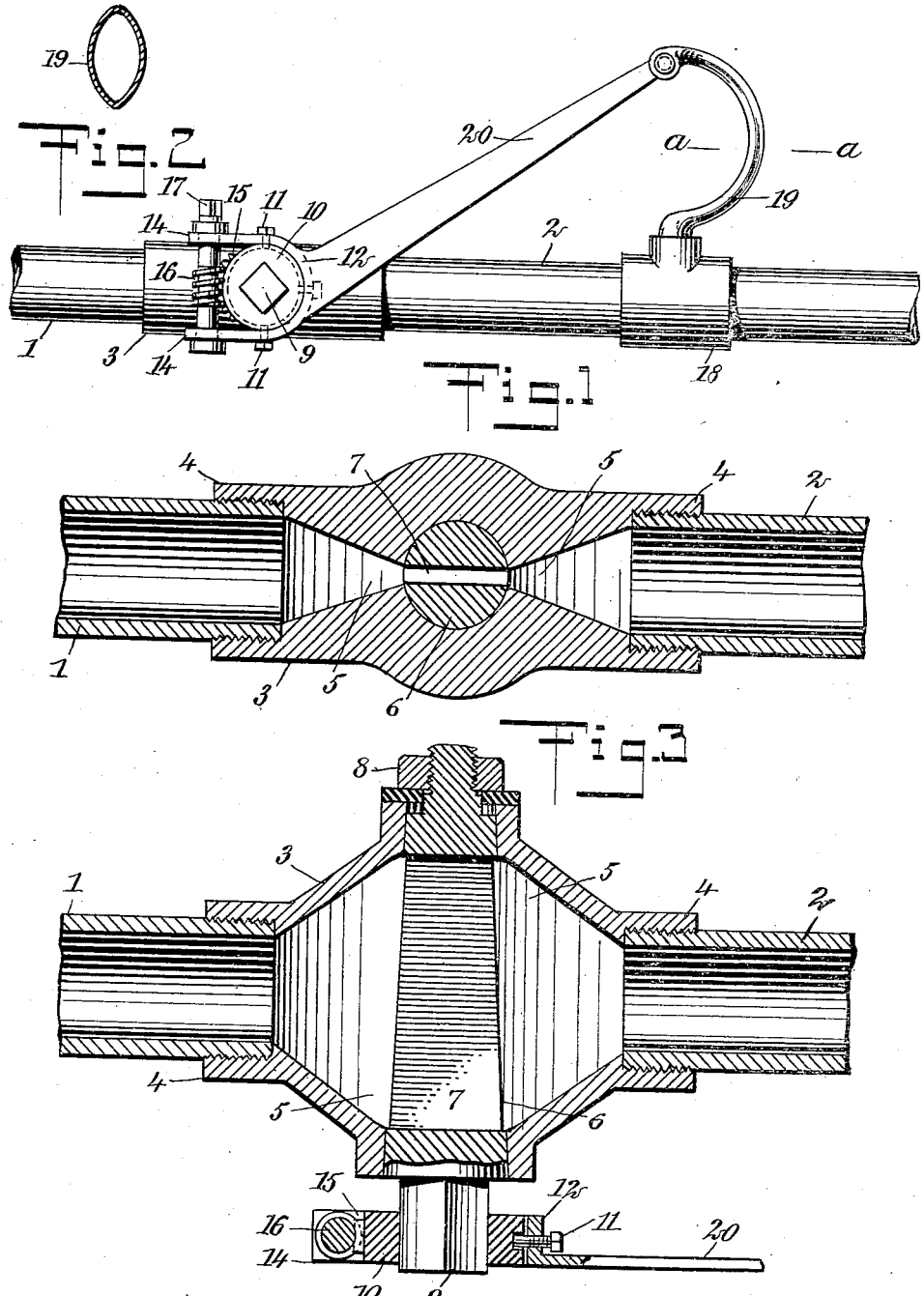

ELMER ENGEBRETSON, OF DEVILS LAKE, NORTH DAKOTA.

CONTROLLING-VALVE.

No. 917,570.  Specification of Letters Patent.  Patented April 6, 1909.

Application filed July 25, 1908. Serial No. 445,312.

*To all whom it may concern:*

Be it known that I, ELMER ENGEBRETSON, a citizen of the United States, and a resident of Devils Lake, in the county of Ramsey and State of North Dakota, have invented a new and Improved Controlling - Valve, of which the following is a full, clear, and exact description.

This invention relates to certain improvements in controlling or reducing valves, and more particularly in that class of such devices which are adapted for operation in a substantially automatic manner for controlling the supply of tensioned fluids; and the object of the invention is to provide a valve of this general character of a simple and comparatively inexpensive nature and of a strong and compact construction, having novel and improved adjusting means whereby its position may be varied relatively to the ports controlled by it, independently of the parts in connection with which the valve is used.

The invention consists in certain novel features of the construction and combinations and arrangements of the several parts of the improved controlling or reducing valve, whereby certain important advantages are attained and the device is rendered simpler, less expensive and otherwise better adapted and more convenient for use, all as will be hereinafter fully set forth.

The novel features of the invention will be carefully defined in the claims.

Reference is to be had to the accompanying drawings forming a part of this specification, in which similar characters of reference indicate corresponding parts in all the views.

Figure 1 is a side elevation showing a controlling or reducing valve embodying my improvements; Fig. 2 is an enlarged fragmentary section taken through the Bourdon or manometric tube in connection with which the valve is used, the plane of the section being indicated by the line *a—a* in Fig. 1; Fig. 3 is an enlarged sectional view, taken through the valve and valve casing in a plane transverse to the axis of the valve plug; and Fig. 4 is a fragmentary sectional view somewhat similar to Fig. 3, but taken in a plane at right angles to that of the section in Fig. 3.

In these views, 1 represents a supply pipe for the steam or other tensioned fluid, 2 represents a discharge pipe therefor, and 3 represents the valve casing interposed between these pipes 1 and 2, said casing being provided with integral nipples 4, 4, for screw connection with said pipes, and having oppositely arranged ports 5, 5, tapered so as to be reduced and elongated lengthwise of the valve plug 6, in such a manner as to correspond with the narrow elongated port 7 which is produced in said valve plug 6. As herein shown, the valve plug is made conical and has its smaller end provided with retaining means 8 of a well known kind. The larger end of the conical valve plug 6 is provided with a squared lug 9, whereon is held an adjusting ring or member 10, having a squared opening fitted upon said squared lug 9, and said adjusting ring or member 10 is adjustably held by means of screws 11, 11, or the like, between the forks 14, 14 of an actuating member or lever 12. Said ring or member 10 is also provided upon its perimetral surface with a series of worm teeth 15, meshing with a worm 16 mounted to turn in the forks 14, 14 of the actuating member or lever 12, and extended transversely between said forks behind the adjusting ring or member 10, the end of said worm 16 being provided with a squared end 17 adapted to receive a wrench or other tool, by means of which said worm may be turned in a well known way.

In the discharge pipe 2 is inserted a nipple or casing 18, with which is connected a Bourdon or manometric tube 19, wherein the tension of the steam or other fluid passing through said pipe 2 is adapted to be exerted, and as herein shown, the upper end of this tube 19 has connection with an arm 20 extended from said actuating member or lever 12, in such a manner that the said member or lever 12 is adapted to be moved pivotally in unison with the movements of said tube 19 under the influence of variations in the tension of the fluid discharged through the pipe 2.

In the use of the improved controlling or reducing valve constructed as herein set forth, the tension of the fluid discharged through the pipe 2 is exerted within the tube 19 in such a manner as to move the same in a well known way, and this movement being communicated to the actuating member or lever 12, serves to turn the valve plug 6 within the valve casing 3, in such a manner as to cut down the flow of fluid from the pipe 1 to the pipe 2, in unison with the rise of pressure in the last named pipe, and inversely, to increase the supply of fluid from the pipe 1 to the pipe 2, in unison with the decrease of pressure within the discharge pipe, thereby effectively controlling and regulating the supply of the tensioned fluid and preventing material variation of pressure within the discharge pipe 2.

By turning the worm 16, it is evident that the adjusting ring or member 10 may be turned independently of the actuating member or lever 12, and since said adjusting ring or member 10 is directly connected with the valve, it will be evident that the latter is capable of being adjusted independently of the actuating member or lever 12 and of the tube 19, so that its port may be positioned at any desired angle with respect to the ports 5, 5 of the valve casing 3, whereby it will be understood that the device may be set to maintain any desirable pressure, within practical limits, in the discharge pipe 2. If desired, the screws 11, 11, or other equivalent means may be employed for holding the adjusting ring or member 10 locked to the actuating member or lever 12.

From the above description of my improvements, it will be seen that the controlling or reducing valve constructed according to my invention, is of an extremely simple and comparatively inexpensive nature, and is particularly well adapted for use by reason of the convenience and accuracy with which the valve may be adjusted relatively to its actuating means in order to accommodate varying requirements of use. It will also be obvious from the above description, that the device is susceptible of considerable modification without material departure from the principles and spirit of the invention, and for this reason I do not desire to be understood as limiting myself to the precise formation and arrangement of the several parts of the device herein set forth in carrying out my invention in practice.

Having thus described my invention, I claim as new and desire to secure by Letters Patent:

1. A device of the character described, comprising a valve casing having ports, a valve controlling the said ports, an adjusting member connected with the valve, an actuating member controlled by variations of pressure of the fluid passing through the casing, means for locking the actuating member to the adjusting member, and means for turning the adjusting member independently of the actuating member to adjust the valve when it is unlocked from the said actuating member.

2. A device of the character described, comprising a valve casing having ports, a plug valve in the casing, an adjusting member on the valve stem, an actuating lever mounted upon the adjusting member and controlled by variations of pressure of the fluid passing through the casing, means for locking the actuating member to the adjusting member, and means for turning the adjusting member independently of the actuating member to adjust the valve when it is unlocked from the actuating member.

3. A device of the character described, comprising a valve casing having ports, a plug valve in the casing, an adjusting member secured to the valve stem, an actuating lever controlled by the pressure of the fluid passing through the casing, said lever having members embracing the adjusting member and adjustably secured thereto, and means for turning the adjusting member independently of the actuating lever to adjust the valve.

4. A device of the character described, comprising a valve casing having ports, a rotary valve controlling said ports, a forked actuating member controlled by variations in the pressure of fluid supplied through the valve casing, a toothed adjusting member on the valve and having connection with the forks of the actuating member, and a worm mounted in the forks of the actuating member and meshing with the adjusting member.

In testimony whereof I have signed my name to this specification in the presence of two subscribing witnesses.

ELMER ENGEBRETSON.

Witnesses:
W. F. CREWE,
HENRY JOHNSON.